US012379821B2

United States Patent
Carbune et al.

(10) Patent No.: US 12,379,821 B2
(45) Date of Patent: *Aug. 5, 2025

(54) SMART ASSIST FOR REPEATED ACTIONS

(71) Applicant: GOOGLE LLC, Mountain View, CA (US)

(72) Inventors: Victor Carbune, Zurich (CH); Daniel Keysers, Stallikon (CH); Thomas Deselaers, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,766

(22) Filed: Nov. 15, 2023

(65) Prior Publication Data

US 2024/0152249 A1 May 9, 2024

Related U.S. Application Data

(63) Continuation of application No. 17/581,390, filed on Jan. 21, 2022, now Pat. No. 11,860,668, which is a
(Continued)

(51) Int. Cl.
*G06F 3/04817* (2022.01)
*G06F 3/0481* (2022.01)
(Continued)

(52) U.S. Cl.
CPC ........ *G06F 3/04817* (2013.01); *G06F 3/0481* (2013.01); *G06F 3/0482* (2013.01);
(Continued)

(58) Field of Classification Search
CPC .. G06F 3/04817; G06F 3/0481; G06F 3/0482; G06F 9/451; G06V 40/10; G06Q 30/0601; G06Q 50/12
(Continued)

(56) References Cited

U.S. PATENT DOCUMENTS 5,731,844 A    3/1998   Rauch et al.
5,946,647 A    8/1999   Miller et al.
(Continued)

FOREIGN PATENT DOCUMENTS

CN    101075236    11/2007
CN    101201827     6/2008
(Continued)

OTHER PUBLICATIONS

European Patent Office; Communication issued in Application No. 23190640.5; 9 pages; dated Oct. 10, 2023.
(Continued)

*Primary Examiner* — Kieu D Vu
*Assistant Examiner* — Nicholas Hasty
(74) *Attorney, Agent, or Firm* — Gray Ice Higdon

(57) ABSTRACT

Systems and methods enable a computing system to recognize a sequence of repeated actions and offer to automatically repeat any such recognized actions. An example method includes determining a current sequence of user actions is similar to previous sequence of user actions, determining whether the previous sequence is reproducible and, when reproducible, initiating display of a prompt that requests approval for completing the current sequence based on the previous sequence and, responsive to receiving an indication of approval, completing the previous sequence. Another example method included determining that a first current sequence of user interactions is complete and is not similar to any saved sequence of user interactions, saving the first current sequence as a previous sequence, identifying a second sequence as satisfying a similarity threshold with the previous sequence, and initiating display of a prompt that requests approval for saving the previous sequence as a shortcut.

19 Claims, 6 Drawing Sheets

Related U.S. Application Data continuation of application No. 15/383,966, filed on Dec. 19, 2016, now Pat. No. 11,237,696.

(51) Int. Cl.
    *G06F 3/0482*      (2013.01)
    *G06F 9/451*       (2018.01)
    *G06Q 30/0601*     (2023.01)
    *G06Q 50/12*       (2012.01)
    *G06V 40/10*       (2022.01)

(52) U.S. Cl.
    CPC ......... *G06F 9/451* (2018.02); *G06Q 30/0601* (2013.01); *G06Q 50/12* (2013.01); *G06V 40/10* (2022.01)

(58) Field of Classification Search
    USPC ........................................................ 715/847
    See application file for complete search history.

(56) References Cited

U.S. PATENT DOCUMENTS

| | | |
|---|---|---|
| 6,662,226 B1 | 12/2003 | Wang et al. |
| 7,054,917 B1 | 5/2006 | Kirsch et al. |
| 7,421,153 B1 | 9/2008 | Ronca et al. |
| 7,548,915 B2 | 6/2009 | Ramer et al. |
| 7,822,759 B2 | 10/2010 | MacLaurin et al. |
| 7,917,514 B2 | 3/2011 | Lawler et al. |
| 8,090,222 B1 | 1/2012 | Baluja et al. |
| 8,131,786 B1 | 3/2012 | Bengio et al. |
| 8,150,911 B2 | 4/2012 | Bell et al. |
| 8,204,966 B1 | 6/2012 | Mendis et al. |
| 8,255,386 B1 | 8/2012 | Annau et al. |
| 8,280,414 B1 | 10/2012 | Nourse et al. |
| 8,341,156 B1 | 12/2012 | Westgate et al. |
| 8,347,237 B2 | 1/2013 | Bier et al. |
| 8,418,055 B2 | 4/2013 | King et al. |
| 8,452,799 B2 | 5/2013 | Zhou et al. |
| 8,453,058 B1 | 5/2013 | Coccaro et al. |
| 8,468,110 B1 | 6/2013 | Podgomy et al. |
| 8,571,319 B2 | 10/2013 | Balasubramanian et al. |
| 8,645,325 B2 | 2/2014 | Anderson et al. |
| 8,671,341 B1 | 3/2014 | Hellwig et al. |
| 8,700,604 B2 | 4/2014 | Roseman et al. |
| 8,767,497 B2 | 7/2014 | Marumoto et al. |
| 8,799,061 B1 | 8/2014 | Chatterjee et al. |
| 8,954,836 B1 | 2/2015 | Look et al. |
| 8,977,639 B2 | 3/2015 | Petrou et al. |
| 9,081,868 B2 | 7/2015 | Zhang et al. |
| 9,165,406 B1 | 10/2015 | Gray et al. |
| 9,176,984 B2 | 11/2015 | Hull et al. |
| 9,276,883 B2 | 3/2016 | Zhang et al. |
| 9,354,778 B2 | 5/2016 | Cornaby et al. |
| 9,424,668 B1 | 8/2016 | Petrou et al. |
| 9,582,482 B1 | 2/2017 | Sharifi et al. |
| 9,703,541 B2 | 7/2017 | Sharifi et al. |
| 11,237,696 B2 | 2/2022 | Carbune et al. |
| 2004/0117750 A1 | 6/2004 | Skoll et al. |
| 2005/0083413 A1 | 4/2005 | Reed et al. |
| 2006/0047639 A1 | 3/2006 | King et al. |
| 2006/0080594 A1 | 4/2006 | Chavoustie et al. |
| 2006/0106844 A1 | 5/2006 | Naick et al. |
| 2006/0141990 A1 | 6/2006 | Zak et al. |
| 2006/0156222 A1 | 7/2006 | Chi et al. |
| 2006/0221409 A1 | 10/2006 | Cohen et al. |
| 2006/0253491 A1 | 11/2006 | Gokturk et al. |
| 2007/0008321 A1 | 1/2007 | Gallagher et al. |
| 2007/0047781 A1 | 3/2007 | Hull et al. |
| 2007/0143345 A1 | 6/2007 | Jones et al. |
| 2007/0168379 A1 | 7/2007 | Patel et al. |
| 2007/0233671 A1 | 10/2007 | Oztekin et al. |
| 2008/0114604 A1 | 5/2008 | Wei et al. |
| 2008/0176606 A1 | 7/2008 | Kim |
| 2008/0235018 A1 | 9/2008 | Eggen et al. |
| 2008/0275701 A1 | 11/2008 | Wu et al. |
| 2008/0281974 A1 | 11/2008 | Slothouber et al. |
| 2008/0301101 A1 | 12/2008 | Baratto et al. |
| 2009/0005003 A1 | 1/2009 | Hartwell |
| 2009/0006388 A1 | 1/2009 | Ives et al. |
| 2009/0036215 A1 | 2/2009 | Saeki |
| 2009/0063431 A1 | 3/2009 | Erol et al. |
| 2009/0138466 A1 | 5/2009 | Henry et al. |
| 2009/0183124 A1* | 7/2009 | Sridhar .................. G06F 3/048 715/847 |
| 2009/0228573 A1 | 9/2009 | Asakawa et al. |
| 2009/0228777 A1 | 9/2009 | Henry et al. |
| 2009/0252413 A1 | 10/2009 | Hua et al. |
| 2009/0282012 A1 | 11/2009 | Konig et al. |
| 2009/0319449 A1 | 12/2009 | Gamon et al. |
| 2010/0010987 A1 | 1/2010 | Smyth et al. |
| 2010/0060655 A1 | 3/2010 | Huang |
| 2010/0088612 A1 | 4/2010 | Jia et al. |
| 2010/0198768 A1 | 8/2010 | Zhou et al. |
| 2010/0250598 A1 | 9/2010 | Brauer et al. |
| 2010/0262928 A1 | 10/2010 | Abbott |
| 2010/0306249 A1 | 12/2010 | Hill et al. |
| 2010/0313141 A1 | 12/2010 | Yu et al. |
| 2011/0067025 A1 | 3/2011 | Cragun et al. |
| 2011/0072455 A1 | 3/2011 | Pickelsimer et al. |
| 2011/0107424 A1 | 5/2011 | Singh |
| 2011/0125735 A1 | 5/2011 | Petrou |
| 2011/0128288 A1 | 6/2011 | Petrou et al. |
| 2011/0131160 A1 | 6/2011 | Canny et al. |
| 2011/0131235 A1 | 6/2011 | Petrou et al. |
| 2011/0145692 A1 | 6/2011 | Noyes et al. |
| 2011/0191676 A1 | 8/2011 | Guttman et al. |
| 2011/0225152 A1 | 9/2011 | Beaudreau et al. |
| 2011/0238768 A1 | 9/2011 | Habets et al. |
| 2011/0246471 A1 | 10/2011 | Rakib |
| 2011/0258049 A1 | 10/2011 | Ramer et al. |
| 2011/0275358 A1 | 11/2011 | Faenger |
| 2011/0283296 A1 | 11/2011 | Chun |
| 2011/0307478 A1 | 12/2011 | Pinckney et al. |
| 2011/0307483 A1 | 12/2011 | Radlinski et al. |
| 2012/0044137 A1 | 2/2012 | Oddiraju et al. |
| 2012/0083294 A1 | 4/2012 | Bray et al. |
| 2012/0092286 A1 | 4/2012 | O'Prey et al. |
| 2012/0117058 A1 | 5/2012 | Rubinstein et al. |
| 2012/0158751 A1 | 6/2012 | Tseng |
| 2012/0159340 A1 | 6/2012 | Bae et al. |
| 2012/0191840 A1 | 7/2012 | Gordon |
| 2012/0194519 A1 | 8/2012 | Bissell et al. |
| 2012/0216102 A1 | 8/2012 | Malla |
| 2013/0080447 A1 | 3/2013 | Ramer et al. |
| 2013/0091463 A1 | 4/2013 | Nordstrom et al. |
| 2013/0097507 A1 | 4/2013 | Prewett |
| 2013/0108161 A1 | 5/2013 | Carr |
| 2013/0111328 A1 | 5/2013 | Khanna et al. |
| 2013/0117252 A1 | 5/2013 | Samaddar et al. |
| 2013/0173604 A1 | 7/2013 | Li et al. |
| 2013/0254217 A1 | 9/2013 | Xu |
| 2013/0263098 A1 | 10/2013 | Duda et al. |
| 2013/0290110 A1 | 10/2013 | LuVogt et al. |
| 2013/0311411 A1 | 11/2013 | Senanayake et al. |
| 2013/0325844 A1 | 12/2013 | Plaisant |
| 2013/0346431 A1 | 12/2013 | Erol et al. |
| 2014/0029810 A1 | 1/2014 | Barr et al. |
| 2014/0040272 A1 | 2/2014 | Houghton |
| 2014/0046965 A1 | 2/2014 | Tian et al. |
| 2014/0082670 A1 | 3/2014 | Papish |
| 2014/0089626 A1 | 3/2014 | Schluessler et al. |
| 2014/0095419 A1* | 4/2014 | Gandhi .................. H04L 67/10 706/46 |
| 2014/0118597 A1 | 5/2014 | Tabak et al. |
| 2014/0142922 A1 | 5/2014 | Liang et al. |
| 2014/0146200 A1 | 5/2014 | Scott et al. |
| 2014/0152655 A1 | 6/2014 | Johnston et al. |
| 2014/0157210 A1 | 6/2014 | Katz et al. |
| 2014/0188889 A1 | 7/2014 | Martens et al. |
| 2014/0208234 A1 | 7/2014 | Amit et al. |
| 2014/0250147 A1 | 9/2014 | Shapira et al. |
| 2014/0279013 A1 | 9/2014 | Chelly et al. |
| 2014/0282660 A1 | 9/2014 | Oztaskent et al. |

(56) References Cited

U.S. PATENT DOCUMENTS

| | | |
|---|---|---|
| 2014/0316890 A1 | 10/2014 | Kagan |
| 2014/0362108 A1 | 12/2014 | Aguera-Arcas |
| 2014/0366158 A1 | 12/2014 | Han et al. |
| 2015/0016700 A1 | 1/2015 | Drozdzal et al. |
| 2015/0019997 A1 | 1/2015 | Kim et al. |
| 2015/0095855 A1 | 4/2015 | Bai et al. |
| 2015/0100524 A1 | 4/2015 | Pantel et al. |
| 2015/0121219 A1 | 4/2015 | Baklanovs |
| 2015/0169701 A1 | 6/2015 | Stekkelpak et al. |
| 2015/0178786 A1 | 6/2015 | Claessens |
| 2015/0212695 A1 | 7/2015 | Nordstrom et al. |
| 2015/0339405 A1 | 11/2015 | Vora et al. |
| 2016/0055246 A1 | 2/2016 | Marcin et al. |
| 2016/0234624 A1 | 8/2016 | Riva et al. |
| 2016/0307210 A1 | 10/2016 | Agarwal et al. |
| 2016/0321052 A1 | 11/2016 | Sharifi et al. |
| 2016/0350673 A1 | 12/2016 | Kumar et al. |
| 2017/0031575 A1* | 2/2017 | Dotan-Cohen ......... G06F 3/038 |
| 2017/0098159 A1 | 4/2017 | Sharifi et al. |
| 2017/0118576 A1 | 4/2017 | Sharifi et al. |
| 2017/0139879 A1 | 5/2017 | Sharifi et al. |
| 2017/0153784 A1 | 6/2017 | Feltham et al. |
| 2017/0289292 A1 | 10/2017 | Aming et al. |
| 2018/0143744 A1 | 5/2018 | Movsisyan et al. |
| 2022/0147227 A1 | 5/2022 | Carbune et al. |

FOREIGN PATENT DOCUMENTS

| | | |
|---|---|---|
| CN | 101221575 | 7/2008 |
| CN | 101233477 | 7/2008 |
| CN | 101587495 | 11/2009 |
| CN | 101763357 | 6/2010 |
| CN | 102098380 | 6/2011 |
| CN | 104506575 | 4/2015 |
| EP | 2306290 | 4/2011 |
| EP | 2466921 | 6/2012 |
| EP | 2728481 | 5/2014 |
| EP | 2824558 | 1/2015 |
| JP | 2003114876 | 4/2003 |
| JP | 2006065921 | 3/2006 |
| JP | 2008026939 | 2/2008 |
| JP | 2008526101 | 7/2008 |
| JP | 2013077329 | 4/2013 |
| JP | 2013210952 | 10/2013 |
| JP | 2016040666 | 3/2016 |
| KR | 1020140009687 | 1/2014 |
| KR | 1020160005045 | 1/2016 |
| WO | 03088080 | 10/2003 |
| WO | 2006071264 | 7/2006 |
| WO | 2009054619 | 4/2009 |
| WO | 2010088217 | 8/2010 |
| WO | 2012075315 | 6/2012 |
| WO | 2013173940 | 11/2013 |
| WO | 2014105922 | 7/2014 |
| WO | 2014146265 | 9/2014 |
| WO | 2016064857 | 4/2016 |

OTHER PUBLICATIONS

Intellectual Property India; Hearing Notice issued for Application No. 201927023493, 2 pages, dated May 25, 2023.
European Patent Office; Intention to Grant issued for Application No. 17884158.1, 48 pages, dated Mar. 27, 2023.
Japanese Patent Office; Notice of Reasons for Rejection issued in App. No. 2019-532963, 6 pages, dated Dec. 19, 2022.
European Patent Office: Communication under Rule 71(3) EPC issue in Application No. 17884158.1; 46 pages; dated Oct. 11, 2022.
Japanese Patent Office; Notice of Reasons for Rejection issued in App. No. 2019-532963, 27 pages, dated Aug. 22, 2022.
Japanese Patent Office; Pre-Appeal Report issued in Application No. 2022-003654, 5 pages, dated Apr. 25, 2022.
China Intellectual Property Administration; Decision of Rejection issued for Application No. 201710906409.3; 6 pages; dated Jan. 10, 2022.
Japanese Patent Office; Decision of Rejection issued in Application No. 2019-532963, 4 pages; dated Nov. 15, 2021.
China National Intellectual Property Administration; Notification of Second Office Action; issued in Application No. 201710906409.3; 21 pages; dated Nov. 3, 2021.
The Korean Intellectual Property Office; Notice of Allowance issued in Application No. 10-2019-7020752; 3 pages; dated Nov. 5, 2021.
Japanese Patent Office; Notice of Reasons for Rejection issued in Application No. 2019-532963, 11 pages; dated Aug. 2, 2021.
Great Britain Intellectual Property Office; Examination Report issued in Application No. 1715581; 11 pages; dated Jul. 15, 2021.
China National Intellectual Property Administration; Notification of First Office Action; issued in Application No. 201710906409.3; 22 pages; dated May 7, 2021.
The Korean Intellectual Property Office; Notice of Office Action issued in Application No. 10-2019-7020752: 6 pages; dated May 27, 2021.
Intellectual Property India; Office Action issue in Application No. 201927023493; 7 pages; dated Feb. 8, 2021.
European Patent Office; Communication issue in Application No. 17884158.1; 15 pages; dated Nov. 27, 2020.
The Korean Intellectual Property Office: Notice of Office Action issue in Application No. 1020197020752; 17 pages; dated Nov. 24, 2020.
European Patent Office: Supplemental Search Report issued for Application No. 17884158.1 dated Aug. 12, 2020.
Zhou, D., et al., "Optimizing User Interaction for Web-based Mobile Tasks," 2010 10th Annual International Symposium on Applications and the Internet; IEEE Computer Society; pp. 68-76 2010.
United Kingdom Intellectual Property Office; Examination Report issued in Application No. 1715581.3 dated Mar. 27, 2018.
Intellectual Property Office of Singapore- International Searching Authority; Notification of Transmittal of the International Search Report and the Written Opinion of PCT Serial No. PCT/US2017/053455; dated Dec. 27, 2017.
Collobert, et al., "Natural Language Processing (almost) from Scratch", Journal of Machine Learning Research, vol. 12, Aug. 1, 2011, pp. 2493-2537.
Minkov, et al., "Extracting Personal Names from Email: Applying Named Entity Recognition to Informal Text", Proceedings of Human Language Technology Conference and Conference on Empirical Methods in Natural Language Processing, available at https://www.cs.cm.edu/-rcwang/papers/emnip-2005.pdf, Oct. 1, 2005, pp. 443-450.
"The new IFTTT is here", IFTTT Blog (https://ifttt.com/blog/2016/11/the-new-ifttt-is-here), printed Nov. 3, 2016, 6 pages.
Adistambha, et al., "Efficient Multimedia query-by-content from mobile devices", Computers & Electrical Engineering XX, vol. 36, No. 4, 2010, pp. 626-642.
Hsu, et al., "Snap2Read: Automatic Magazine Capturing and Analysis for Adaptive Mobile Reading," Lecture Notes in Computer Science, vol. 6524, 2011, 11 pages.
Japan Patent Office, Office Action issued in Application No. 2019-532963, dated Nov. 2, 2020 (13 pages).
Deutsches Patent Office; Office Action issued in Application No. 102017121758.4; 18 pages; dated Feb. 12, 2024.

* cited by examiner

SMART ASSIST FOR REPEATED ACTIONS

BACKGROUND

Many users repeat certain tasks on a mobile device, such as ordering a pizza, requesting a taxi/car service, downloading bank statements, purchasing public transportation, etc. For these tasks, the user repeats a workflow, which is represented by a sequence of actions, every time the user performs the task.

SUMMARY

System and methods recognize workflows repeated by a user, understand when the user starts to repeat them, and offer to complete the sequence automatically. A workflow is represented as a sequence of actions. Each action in the sequence is described at a high level, e.g., without reference to screen coordinates or pixel locations, to make comparisons with previous completed workflows more robust. The system may compare a current workflow, even if not complete, with previously performed workflows to determine if the current workflow represents a sequence of actions previously performed. If the current workflow is sufficiently similar the system may offer to reproduce the workflow for the user. In some implementations, the system may also calculate a confidence score for the current workflow and similar previous workflow and may only offer to reproduce the workflow if the system is confident that the system can successfully complete the workflow automatically. Some implementations may enable the user to save one or more of the repeated workflows, represented as a sequence of actions, as a shortcut, e.g., on the home-screen, as an app option, and/or a voice command.

According to certain aspects of the disclosure, a method includes According to certain aspects of the disclosure, a method includes determining a current sequence of user actions with a mobile application is similar to a previous sequence of user actions and calculating a confidence score reflecting reproducibility of the previous sequence. The method also includes initiating, when the confidence score satisfies a confidence threshold, display of a prompt that requests approval for completing the current sequence of user actions using the previous sequence and completing the previous sequence responsive to receiving an indication of approval of the completion.

According to certain aspects of the disclosure, a method includes determining that a first current sequence of user interactions fails to satisfy a similarity threshold with previous sequences of user interactions, determining that a first current sequence of actions is complete, and saving the first current sequence as a first previous sequence. The method also includes identifying a second current sequence as satisfying the similarity threshold with the first previous sequence and initiating display of a prompt that requests approval for saving the first previous sequence as a shortcut.

According to certain aspects of the disclosure, a system includes at least one processor and memory storing instructions that, when executed by the at least one processor, causes the system to generate a user interface. The user interface is configured to initiate recording a shortcut sequence of actions, each action in the sequence of actions being a high level description of a user interaction with a user interface. The user interface may also be configured to receive an indication that account data in a sequence of actions is to be included in the actions. The user interface may also be configured to receive art indication that sharing previous sequences of actions is permitted. The user interface may also be configured to clear previously stored sequences of actions. The user interface may also be configured to rename the shortcut sequence of actions. The user interface may also be configured to select applications in which the system captures a sequence of actions. The user interface may also be configured to receive an indication that a previous sequence of action can be shared.

In one general aspect, a computer program product embodied on a computer-readable storage device includes instructions that, when executed by at least one processor formed in a substrate, cause a mobile device to perform any of the disclosed methods, operations, or processes. Another general aspect includes a system with a user interface and/or a method for generating a user interface that enables a user to control and customize when and what actions performed on the mobile device can be stored in a workflow for comparison to future potentially repeated actions. Another general aspect includes a system and/or method for determining when to offer assistance in completing an action, substantially as shown in and/or described in connection with at least one of the figures, and as set forth more completely in the claims.

One or more of the implementations of the subject matter described herein can be implemented so as to realize one or more of the following advantages. As one example, implementations provide a shortcut for repeating an often-used sequence of actions. The shortcut can be explicitly requested by the user or can be suggested to the user based on analysis of a similar sequence of actions performed in the past. When the shortcut is initiated by the user the system automatically completes the workflow represented by the shortcut. As another example, the system can identify a repeated workflow and offer to automatically complete the workflow for the user. Such examples of automatic completion reduce battery usage, processing cycles, RAM memory usage, and use of other system resources by reducing the time to complete a workflow and reducing or eliminating user input needed to complete the workflow. The framework for recording a workflow as a sequence of actions is flexible and the actions are captured at a high-level, allowing for similar sequences to be identified despite changes to the layout of a user interface, e.g., moving a control or input text box and changes to the order of actions within the sequence. Some implementations provide a control mechanism that is granular, e.g., allowing the user to determine what information can or cannot be captured as part of the sequence, whether to disable or share sequences, when to capture sequences, etc.

The details of one or more implementations are set forth in the accompanying drawings and the description below. Other features will be apparent from the description and drawings, and from the claims.

BRIEF DESCRIPTION OF DRAWINGS

FIG. 11 is a block diagram illustrating an example system in accordance with the disclosed subject matter.

Like reference symbols in the various drawings indicate like elements.

DETAILED DESCRIPTION

Figure 1:
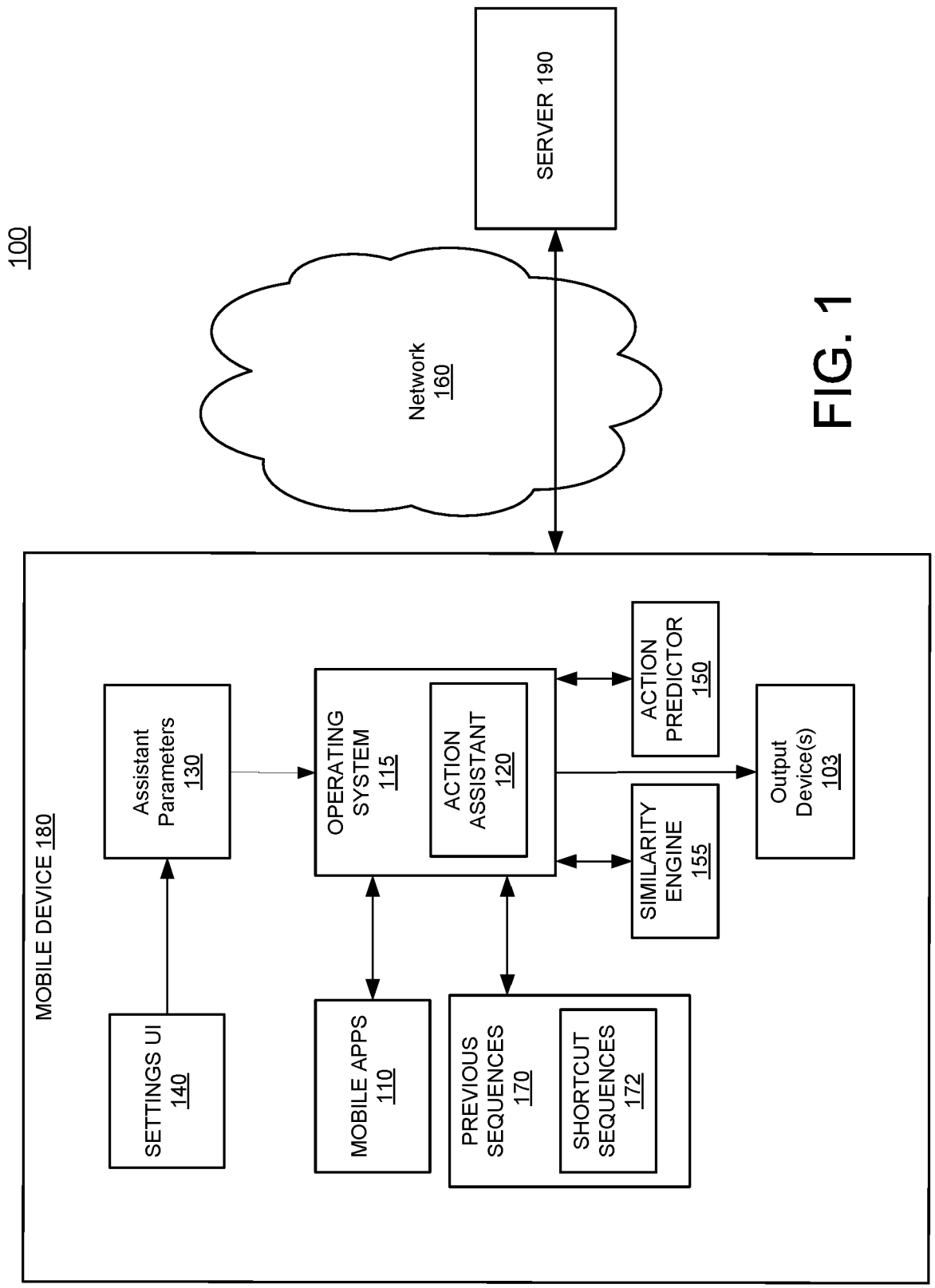

A system for more efficient processing on a computing device, especially a mobile device, recognizes when a user has started a repeated and repeatable workflow and enables the user to instruct the device complete the workflow without further input, or with minimal input, from the user, Example systems observe input provided by a user to a mobile application or web site as well as what text, images, and sounds are provided by the application to the user. The example systems record the sequence of actions (inputs, response, etc.) representing the workflow at a high level, so that minor changes to screen layout and variable portions of a user interface (e.g., ad banners) do not affect the sequence. The system provides for user-control over what sequences are captured.

Example system may store the workflow descriptions, e.g., the sequences of actions, and may use a similarity engine, which can be a partially machine-learned, to determine when the user is repeating a previous sequence. The similarity metric takes as inputs signals recorded for the sequences, which can include any characteristic of the sequence, including time of day, day of week, application used, number and type of inputs, approximate area of screen pressed, order of inputs, etc. The similarity engine may be configured to assess similarity even in the presence of slightly changed components, including a different order of actions within the sequence. Thus, a slightly changed layout, different banners on a web page, or different ads or offers in a mobile app do not affect the capability to compare sequences. The similarity engine can be based on edit distance, for example.

When the system determines that a sequence of actions is similar enough to a previous sequence, the system may offer to complete the workflow. In some implementations, before offering to complete the workflow, the system may generate a prediction about whether the system can reproduce the action represented by the sequence. An action predictor may generate this prediction, and the action predictor may be another machine-learned model (fully or partially learned) that provides a confidence score based on several factors, such as behavior of the user across multiple sequences in the same context, context of the action, similar sequences by other users (if available), how often the user interface changes, etc. The confidence score may be classified as low, medium, or high. If the confidence is low, the system may not perform any action. If medium, the system may flag the sequence as a potential suggested completion. Tor example, the system may 'observe and learn' to see whether the user performs that action again which may increase the confidence the next time it is encountered. If the confidence score is high, the system may suggest the sequence to the user. The user can optionally save the workflow as a shortcut, if the user opts to have the system reproduce the sequence, the system can either reproduce the actions in the background or show the user what is input by the sequence and the responses by the application. Example systems may provide for user-control over what actions are captured, what information is captured, and whether saved sequences are available for sharing.

FIG. 1 is a block diagram of a smart assist system 100 in accordance with an example implementation. The smart assist system provides a process that reduces resource consumption and user input to complete certain repeated workflows. In some implementations, the assist system 100 intelligently selects which repeated work: lows to offer to complete, so that the system avoids suggesting workflows that may not be automatically completed successfully. The smart assist system 100 provides a consistent user experience across mobile applications so that, with user approval, a sequence of actions repeated in any application can be automatically completed, or in other words be completed by a smart assist. In some implementations, the system 100 may also include a process that allows a user of a mobile device to share a workflow with another user, e.g., to transfer the sequence of actions represented by the workflow to another mobile device, A smart assist allows a mobile device to automatically perform or complete a workflow with no input or with minimal input from the user. This conserves system resources, such as battery consumption, memory usage, processor cycles, as the device can complete the workflow faster than a human user.

Figure 6:
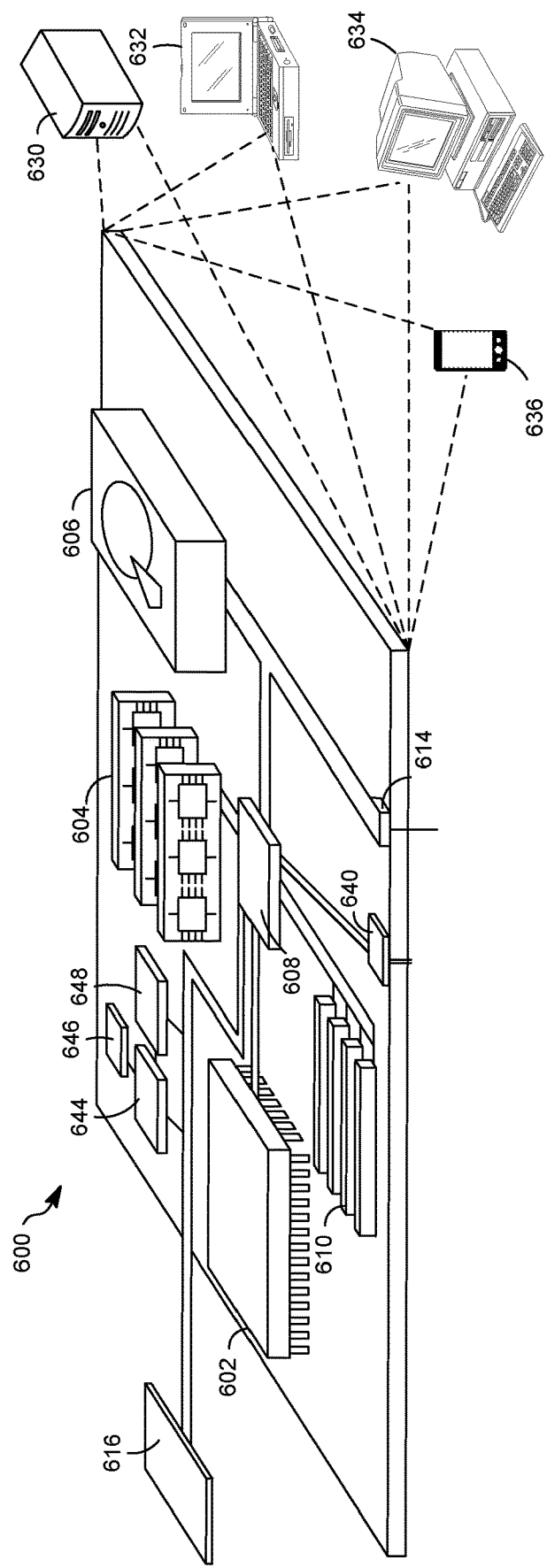
FIG. 6 shows an example of a computer device that can be used to implement the described techniques.

The smart assist system 100 may include mobile device 180. Mobile device 180 may be any mobile personal computing device, such as a smartphone or other handheld computing device, a tablet, a wearable computing device, etc., that operates in a closed mobile environment rather than a conventional open web-based environment. In some implementations, mobile device may be a personal computer, a netbook, or a laptop. Mobile device 180 may be an example of computer device 600, as depicted in FIG. 6. Mobile device 180 may include one or more processors formed in a substrate configured to execute one or more machine executable instructions or pieces of software, firmware, or a combination thereof. The mobile device 180 may include an operating system 115. The mobile device 180 may include one or more computer memories configured to store one or more pieces of data, either temporarily, permanently, semi-permanently, or a combination thereof. The mobile device 180 may thus include applications, including mobile applications 110, action assistant 120, and/or settings UI 140, which represent machine executable instructions in the form of software, firmware, or a combination thereof. The mobile device 180 may also include one or more output devices 103. The output devices may include a display device for displaying visual content and speakers for presenting audio content.

The mobile device 180 may include action assistant 120. The action assistant 120 may be configured to observe input provided by a user to one or more mobile applications, web applications, and/or web sites, any of which may be referred to as "an application." The action assistant 120 may also observe text, images, and sounds that are provided by the application to the user. User actions represent user input gestures such as taps, swipes, text input, or any other action the user takes to interact with a user interface of the application. For instance, a user action may be any action the user takes to interact with a touch-screen of the mobile device 180. A user action may also be any text or selections entered by the user via an input device, such as a mouse, a keyboard, trackpad, a microphone, etc. The action assistant 120 may capture the observations at a high level and store the captured observations as a workflow represented by a sequence of actions. Thus, a sequence of actions can include inputs, outcomes, responses, etc. captured at a high level. A sequence captured at a high level does not include details such as pixel locations that the user selected. Rather, actions captured at a high level identify what the user achieved through the actions. For example, a pizza order workflow may be captured as the following sequence of actions:
1. go to main menu
2. select large pizza
3. modify large pizza bye adding pepperoni and olives
4. enter quantity 2
5. select <add to cart> control
6. select large pizza
7. modify large pizza by adding green peppers, onions, olives, and mushrooms
8. enter quantity
9. select <add to cart> control
10. select <checkout> control
11. confirm saved payment information
12. select delivery time of soonest possible
13. select <confirm order> control
14. exit application As another example, the pizza order workflow may be captured as the following sequence of actions, which illustrates a more structured approach:
1. [seleet:main menu]
2. [seleet:size.1g]
3. [select:topping.pcp] & [select:topping.bo]
4. [select:q.2]
5. [select:add cart]
6. [select:size.1g]
7. [select: topping.gp] [select:topping.o] & [select:topping.bo] select[topping.mush]
8. [select:q.1]
9. [select:add cart]
10. [select:cheekout]
11. [select:ccl]
12. [seleet:del.asap]
13. [select:order]
14. [select:exit]

As illustrated by the two examples above the sequence includes features about content provided by the application (e.g., a topping control and its values) and features about input provided by the user (what controls are selected and with which values). The action assistant 120 may determine the boundary between one action sequence and another action sequence in a number of ways. For example, the system may determine a sequence has ended based on an explicit command from the user designating the sequence as complete. As another example, the system may determine a sequence has ended based on the user switching to another application or the user closing the application. As another example, the system may determine a sequence has ended based on a notification from the application, a message indicating "order is complete," "order received," or something similar.

The action assistant 120 may store the sequence of actions a as a previous sequence for later reference, for example in previous sequences 170. In addition to storing the sequence of actions, the action assistant 120 may also store metadata about the sequence. The metadata may also be referred to as signals for the sequence. The signals can include any characteristic of the sequence, including time of day, day of week, application used, number and type of inputs, approximate area of screen pressed, order of inputs, whether the device was moving, etc. For example, as context for the sequence the action assistant 120 may record a timestamp for each action that indicates when the action occurred, including weekday, time of day, whether the day is a holiday, etc., a location stamp that indicates where the user was, a location history, previously used applications, previous sequences of actions, etc. In some implementations, the signals may be stored as an array of values, e.g., an array of floating point numbers, an array of text strings, an array of enumeration values, etc. The system may store the metadata with the sequence of actions, e.g., in previous sequences 170.

The action assistant 120 may use a similarity engine 155, which can be partially learned, and the previous sequences 170 to determine when the user begins repeating an action. The similarity engine 155 may be a prediction model that generates a similarity metric between a current sequence of actions and one or more of the previous sequences 170. The similarity engine 155 may take as input a current sequence of actions, one or more previous sequence of actions e.g., from previous sequences 170, and the metadata or signals for each of the sequences. In some implementations, the metadata may be provided as a feature vector. The similarity engine 155 provides a similarity metric between the current sequence and each of the previous sequences. The similarity metric may be based on a number of different metrics, such as edit distance, for example. In some implementations, the system may only select a previous sequence of actions when the previous sequence has some minimal commonality with the current sequence of actions, such as sharing the same application. The similarity engine 155 is configured to assess similarity even in the presence of slightly changed components. Thus, different banners on a web page, different ads or offers in a mobile app, a slightly changed layout, or a different order of the actions do not affect the capability of the similarity engine 155 to compare two sequences. In some implementations, the similarity metric may be generated by a machine-learned algorithm. In some implementations, the similarity engine 155 may be provided to the mobile device 180 periodically from a server, e.g., server 190.

The action assistant 120 uses the similarity metric to determine whether the current set of actions is sufficiently similar to one or more previous sets. For example, the action assistant 120 may compare the metric with a similarity threshold. The threshold may be adjusted based on a number of factors, such as whether the system made good predictions in the past, whether previous sequence is saved as a shortcut, how many previous sequences match each other as well as the current sequence, etc. The similarity metric calculated by the similarity engine 155 may be dependent on how complete the current workflow is. For example, just opening a mobile application used to order a pizza from a particular restaurant may be sufficiently similar to a previous sequence for that particular application because a plurality of previous sequences are sufficiently similar for that application. Thus, the similarity engine 155 may have a high degree of confidence that the user will want to perform the same action again using the application. In contrast, the user may use a reservation mobile application to make reservations at multiple different restaurants. Thus, just opening the reservation application is not sufficiently similar to any one particular previous sequence without further context. For example, if the user makes a reservation for the same restaurant at the same time of the month, or when at a particular location, these signals may be used to boost the similarity metric for a particular previous sequence for that restaurant when the current sequence of actions shares the signals.

When the action assistant 120 determines that the current sequence of actions is similar enough to a previous sequence, the action assistant 120 may generate a prediction about whether the system can reproduce the action represented by the previous sequence. The action assistant 120 may use an action predictor 150 to generate the prediction. In some implementations, the action predictor 150 may use the similarity metric as a confidence score. In other words, the similarity metric may meet a similarity threshold and, if it meets the similarity threshold may be compared against one or more confidence thresholds. In some implementations, the action predictor 150 may be another machine-learned model, fully or partially learned, that provides a separate confidence score. The confidence score can be based on several factors, such as behavior of the user across multiple sequences in the same context, context of the workflow, similar sequences by other users (if available), how often the user interface for the workflow changes, the variability of choices in the user interfaces for the workflow, etc. The confidence score may be classified as low, medium, or high. If the confidence is low, the action assistant 120 may not track the workflow further and does not offer to reproduce the workflow. A confidence score may be low because it is too difficult to reliably reproduce the previous user actions in the sequence. If the confidence score is classified as medium, the system may flag the sequence as a potential suggested completion. For example, in some implementations, the system may enter an 'observe and learn' mode to determine whether the user performs that workflow again. In some implementations, the system may be in an observe and learn' mode unless attributes about the computing environment (e.g., user settings, particular applications) prevent such a mode. The next time the action assistant 120 encounters the sequence, the action predictor 150 may increase the confidence score. Once the same sequence has been encountered a minimum number of times the confidence score may be classified as high instead of medium. On the other hand, the action assistant 120 may determine, after some period of time, that the sequence is not repeated over time, e.g., the sequence often varies, and the action predictor 150 may decrease the confidence score from medium to low. A medium confidence score indicates uncertainty about whether the sequence of actions can be completed.

If the confidence score is classified as high, the action assistant 120 may initiate a prompt that offers to complete the action for the user. If the user indicates approval of having the system complete the action, the action assistant 120 may also initiate a prompt that gives the user an opportunity to save the sequence of actions, or in other words the workflow, as a Shortcut, e.g., in shortcut sequences 172. The shortcut sequences may be previous sequences that the user has designated as a shortcut. This may be done in response to the prompt or may be done in an explicit mode where the user records a sequence of actions, which is designated as a shortcut when the sequence is complete. Each shortcut sequence may be associated with a respective voice command so that the user can initiate the shortcut via the voice command. The shortcut may also be associated with a control, e.g., a selectable icon, that can be placed on a home screen of a mobile device, or some other location in a user interface of the mobile device. In some implementations, the shortcut sequence may be associated with a name or description. In some implementations, the shortcut sequence may be associated with a particular input sequence, such as a long press and a swipe, selected by the user.

When the user opts to have the system complete a workflow, e.g., reproducing the previous sequence, the action assistant 120 uses the previous sequence to complete the workflow. Thus, reproducing the workflow means finishing the workflow, e.g., performing the actions in the sequence that are not in the current sequence of actions but are in the previous sequence of actions. If the user initiates a workflow using a shortcut (e.g., the voice command or selection of the icon for the shortcut), reproducing the workflow includes performing all of the actions included in the sequence of actions for the shortcut. In some implementations, the action assistant 120 may reproduce the actions in the background. This may include only displaying the final user interface generated by the application at the end of the sequence of actions. This may also include displaying some intermittent user interfaces, rather than all of the user interfaces, while automatically performing the actions. In some implementations, the action assistant 120 may reproduce the workflow as if the user were actually providing input, i.e., showing the user what is input by the action assistant 120 in performing the action and the user interface generated by the application in response to the input.

In order to reproduce a workflow, the action assistant 120 uses the previous sequence of actions that is similar to the current sequence of actions to provide input to the application associated with the previous sequence. Because the action assistant 120 is part of the operating system, the action assistant 120 has access to the user interface components generated by the application (e.g., the mobile application, web application, or website). Thus, for example, the action assistant 120 can identify a text box in the user interface and provide text for the text box, or find a control and simulate a selection of the control. The reproduction of a sequence of actions can be accomplished via simulating the user behavior, e.g., clicks, taps, typing, etc., or other conventional methods.

The action assistant 120 may use assistant parameters 130 to determine when to observe and store sequences of actions, what kind of information to store with a sequence of actions, what information to use in reproduce the actions, whether a sequence can be shared, etc. For example, the assistant parameters 130 may include a parameter that indicates one or more applications for which the action assistant 120 is active. As another example, the assistant parameters 130 may include a parameter that indicates one or more applications for which the action assistant 120 is never active. If the action assistant 120 is not active, the action assistant does not observe, capture, or save sequences of actions and, therefore, does not offer to complete a sequence.

The assistant parameters 130 may include one or more parameters that identify input not to be captured as part of a sequence of actions. For example, the user can specify that the action assistant 120 may not record or store user names, passwords, account numbers, user identifiers, etc. When the action assistant 120 observes input in an action that is not to be captured/described/recorded, the action assistant 120 may end the current sequence of actions. In other words, in some implementations, an input that is not to be captured terminates the sequence. The sequence may be considered complete because any further actions cannot be automatically reproduced. In some implementations, the action assistant 120 may use a token in place of the input provided by the user so that the action can be captured without the input. In such an implementation, the action assistant 120 cannot automatically reproduce the action—the action assistant 120 would need the user to provide the input represented by the token to continue reproducing the full sequence. In some implementations, certain input, such as payment or account information, may not be collected for an action by default, unless the user specifically requests that such information be collected for an action in a sequence of actions, The mobile device 180 may also include settings UI 140. The settings UI 140 may be configured to enable the user to view, add, or change the parameters in the assistant parameters 130. In other words, in some implementations, the settings UI 140 may provide the user of the mobile device 180 with the ability to control the action assistant 120. The level of granularity provided by the settings UI 140 may depend on the implementation. For example, the settings UI 140 may enable the user to select a mobile application 110 or a type of mobile application 110 and turn on or turn off the action assistant 120 for that application. 110 or type of application. As another example, the settings UT 140 may enable the user to place restrictions on input included in a sequence of actions. As another example, the settings. UI 140 may enable the user to disable the action assistant 120. As another example, the settings UI 140 may enable the user to select levels of input restrictions. A restriction may allow capture of a sequence of actions on the mobile device 180 but prevent or disallow the sharing of the sequences. For example, some users may share shortcut sequences 172 with another device or share previous sequences with a server 190 to help train and refine the similarity engine 155 and/or the action predictor 150. Other users may use the settings UI 140 to prevent any sharing. In some implementations, the settings UI 140 may enable the user to delete some or all sequences of actions in previous sequences 170. In some implementations, the developer of the action assistant 120 may provide the settings UI 140. In some implementations, a developer of a mobile application 110 may provide some functionality of the settings UI 140 that pertains to the mobile application 110. In other words, when a user downloads and installs the mobile application 110 the mobile application may enable the user to make the action assistant 120 active or inactive for the mobile application 110. The settings UI 140 may also include a control or option to explicitly record a shortcut sequence. This is a special training mode where the user explicitly performs a set of actions and saves the set as a shortcut sequence. As with other shortcut sequences, the user may be able to save a name, a control, and/or a voice command for the shortcut.

While settings UI 140, similarity engine 155, action predictor 150, and action assistant 120 are illustrated as separate applications running on the mobile device 180, it is understood that one or more of the components identified in the settings UI 140, similarity engine 155, action predictor 150, and the action assistant 120 may be part of the operating system 115. In some implementations, all components of the action assistant 120, similarity engine 155, action predictor 150, and settings UI 140 may be part of the operating system 115. In some implementations, one or more of the components of settings UI 140 may be performed at the server 190 so, for example, the user could have an action assistant profile that is downloaded to update the assistant parameters 130 for any mobile device the user is logged into.

Figure 7:
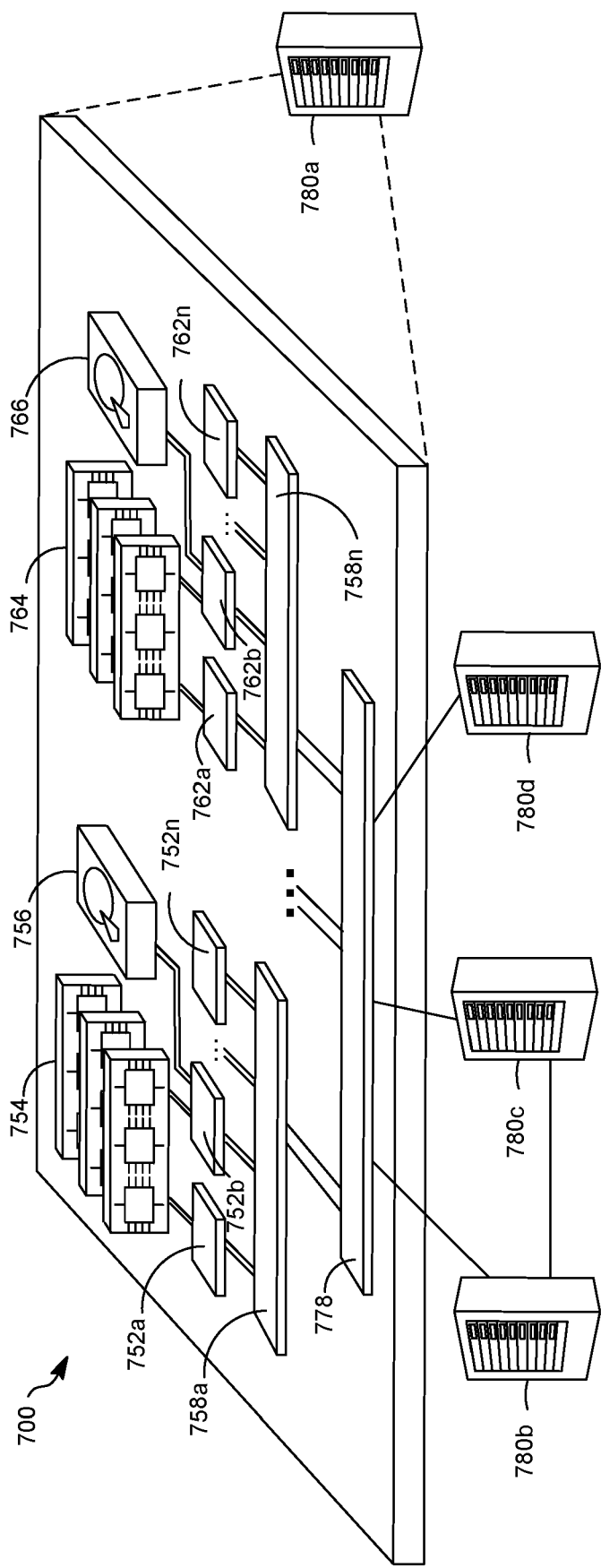
FIG. 7 shows an example of a distributed computer device that can be used to implement the described techniques.

The smart assist system 100 may include a server 190, which may be a computing device or devices that take the form of a number of different devices, for example a standard server, a group of such servers, or a rack server system, which can be distributed across multiple computing devices. In addition, server 190 may be implemented in a personal computer, for example a laptop computer. The server 190 may be an example of computer device 600, as depicted in FIG. 6, or computer device 700, as depicted in FIG. 7. Server 190 may include a user account for the user of mobile device 180 and may be used to store information, such as an assistant parameter profile, for the user. The server 190 may also receive, with user permission, previous sequences. The server 190 may use the previous sequences to better train and improve, e.g., via across-user training, the similarity engine 155. The server 190 may use the previous sequences to better train and improve, e.g., via across-user training, the action predictor 150. In some implementations, the server 190 may be configured to notify a developer of a mobile application when a pattern for the mobile application is determined across several users. For example, by analyzing previous anonymized sequences across many users, the server 190 may determine that 90% of users share a similar workflow i.e., similar sequence of actions. Such a high commonality demonstrates user need for the workflow and the system may notify the developer of the application of the workflow so that the workflow can be offered natively (which could be performed even faster than reproduction of the sequence of actions).

The mobile device 180 may be in communication with the server 190 and with other mobile devices over network 160, Network 160 may be for example, the Internet, or the network 160 can be a wired or wireless local area network (LAN), wide area network. (WAN), implemented using, for example, gateway devices, bridges, switches, and/or so forth. Network. 160 may also represent a cellular communications network. Via the network 160, the server 190 may communicate with and transmit data to/from mobile device 180 and the mobile device 180 may communicate with and transmit data to the server 190 and other computing devices.

The smart assist system 100 represents one example configuration and implementations may incorporate other configurations. For example, some implementations may combine one or more of the components of the settings UI 140, action assistant 120, operating system 115, mobile applications 110, similarity engine 155, and action predictor 150 into a single module or engine, one or more of the components of the settings UI 140 may be performed by the server 190. As another example one or more of the data stores, such as assistant parameters 130 and previous sequences 170 may be combined into a single data store, may be distributed across multiple data stores or files, may distributed across multiple computing devices, or may be stored at the server 190.

To the extent that the smart assist system 100 collects and stores user-specific data or may makes use of personal information, the user may be provided with an opportunity to control whether programs or features collect the user information e.g., information about a user's social network, social actions or activities, user input actions, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a smart assist system.

It is noted here, and applicable to various of the embodiments described herein, that capabilities may be provided to determine whether capture of actions and other functionality is consistent with rights of use of content, layout, functionality or other aspects of the image being displayed on the device screen, and setting capabilities accordingly. For example, some assistant parameters 130 may limit saving sequences of actions where doing so could be in contravention of terms of service, content license, or other limitations on use. Such settings may be manually or automatically made, such as by a user when establishing a new service or device use permissions, or by an app installation routine or the like and may not be modifiable via settings UI 140.

Figure 2:
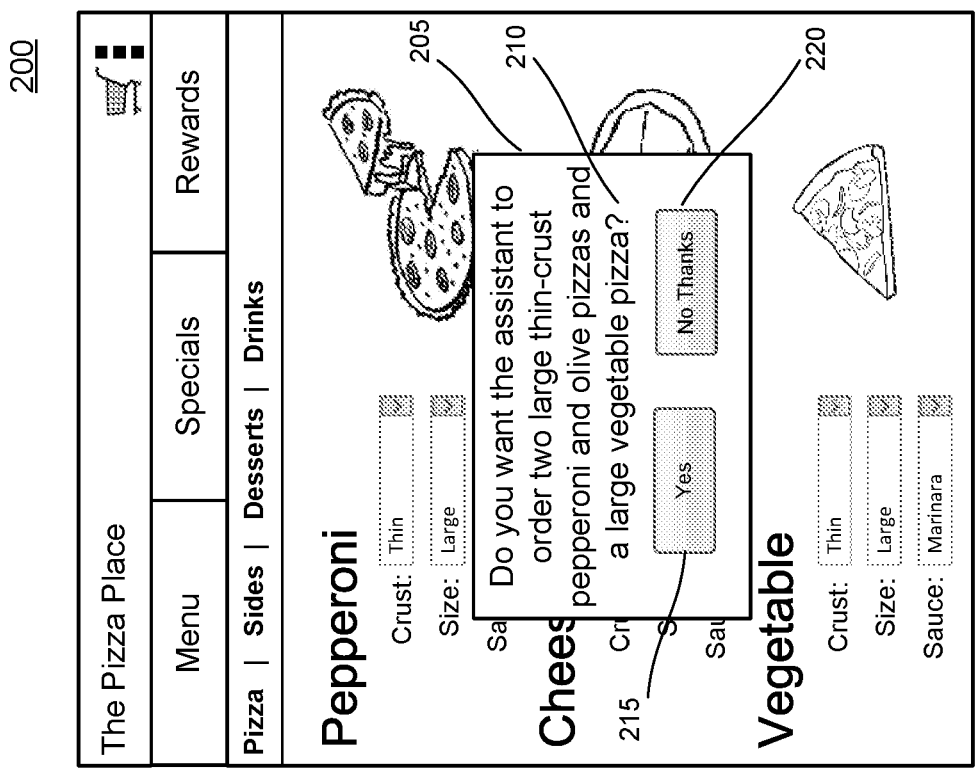
FIG. 2 illustrates an example display of a mobile computing device with a smart assist prompt, according to an implementation.

FIG. 2 illustrates an example display of a mobile computing device with a smart assist prompt, according to an implementation. A smart assist system, such as system 100 of FIG. 1, may generate the prompt 205 in the display 200. In the example of FIG. 2, the user has used the pizza place application at least one previous time to order a large thin-crust pepperoni pizza and a large vegetable pizza. Thus, in the example of FIG. 2, the system has stored at least one previous sequence of actions that capture the input provided by the user to complete the order. For example, the previous sequence of actions may be stored as (e.g. in previous sequences 170):

1. open the pizza place application
2. select <customize> control
3. select large size, select thin crust
4. select <next> control
5. select pepperoni and olives
6. enter quantity 2
7. select <add to cart> control
8. select <continue order> control
9. select <Vegetable> control
10. enter quantity 1
11. select <add to cart> control
12. select <checkout> control
13. confirms saved payment information
14. select delivery time of soonest possible
15. select <confirm order> control
16. exit application The system may have determined that this previous sequence is similar to a current sequence based on a number of factors. For example, the user of the system may have placed this order multiple times on a Friday evening and the current time corresponds to Friday evening. As another example, the user may have only placed this order in the past. In either of these cases the system may offer prompt 205 as soon as the user opens the Pizza Place application. As another example, the system may determine the order is similar to the previous sequence of actions above after the user places the two large thin-crust pizzas in the cart. This may occur when there is another sequence for the pizza place application that includes an order for a small pizza. Of course, other factors may be used to determine that the current sequence is similar.

In addition to determining that the current sequence is similar to the previous sequence, the system may determine that there is a high confidence that the action can be reproduced. For example, the pizza place application user interface may not change often and/or there may be a history of reliable user behavior within the application. Once the system decides that the current sequence of actions is sufficiently similar to a previous sequence, the system may initiate display of prompt 205. Prompt 205 may include a description 210 of the sequence of actions to be reproduced. The description 210 is a textual version of a high level description of the sequence generated using conventional techniques. The prompt 205 may also include an approval control 215 and a disapproval control 220. If the user selects the disapproval control 220, in some implementations, the system may mark the sequence as declined, e.g., via an attribute or setting the confidence to low values, so that the system does not offer to complete the sequence of actions again for this user. In some implementations, when the user selects the disapproval control 220, the system may raise the confidence threshold, which causes the system to offer the sequence less often. If the user selects the approval control 215 the system may begin reproducing the actions. For example, the system may simulate the input provided by the user in the previous sequence of actions. Because the actions are recorded at a high level, the system can reproduce the actions regardless of changes to layout. However, changes to the interface that affect the controls, e.g., the input boxes, drop-down menus, etc. may make affect the ability to reproduce an action, in some implementations, the display 200 may show the actions as they are reproduced. In some implementations, the display 200 may reproduce the sequence in the background, e.g., without displaying intervening screens generated by the pizza place application, or only displaying certain screens, e.g., a screen that confirms the order was placed. Such an implementation further reduces usage of system resources, as several screens that would otherwise be rendered to the display are instead handled by the action assistant.

Figure 3:
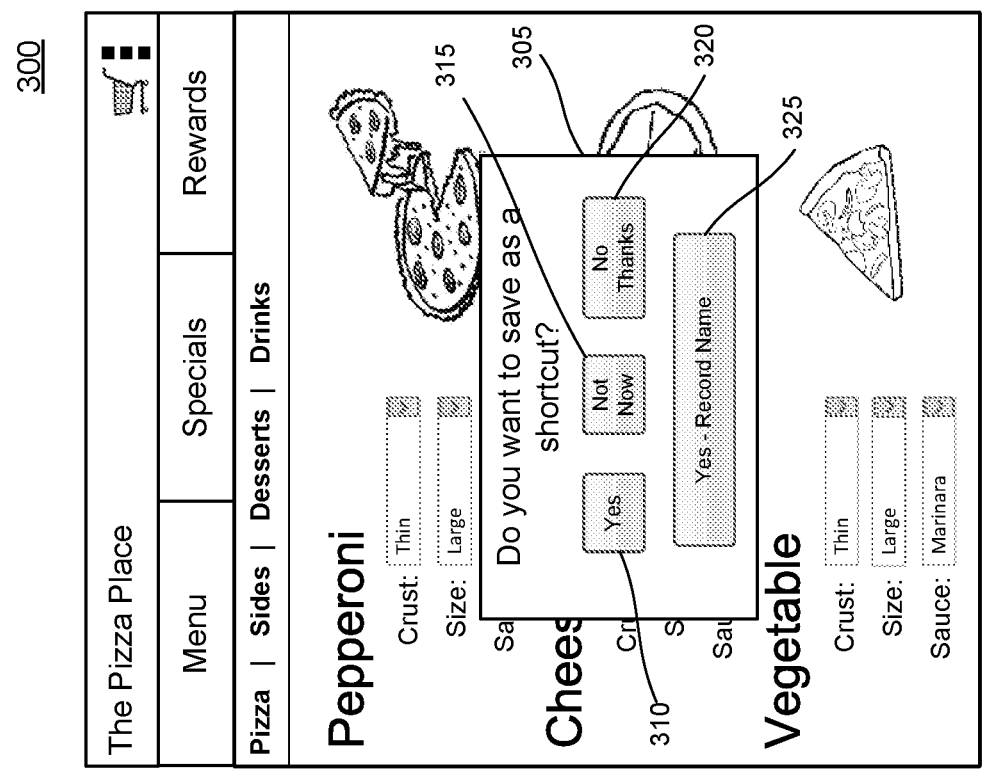
FIG. 3 illustrates an example display of a mobile computing device with a shortcut prompt, according to an implementation.

FIG. 3 illustrates an example display of a mobile computing device with a shortcut prompt, according to an implementation. A smart assist system, such as system 100 of FIG. 1, may generate the prompt 305 in display 300. In the example of FIG. 3, the user may have selected the approval control 215 of FIG. 2 and the system may determine that the previous sequences have not previously been saved as a shortcut sequence and the user has not previously indicated disapproval for the shortcut. Before reproducing the actions in the previous sequence, the system may then generate prompt 305. The shortcut prompt 305 may include an approval control 310 or 325, an indecision control 315, and/or a disapproval control 320. If the user selects the disapproval control 320 the system may mark the previous sequence as explicitly disapproved of as a shortcut and proceed to reproduce the sequence. This may be done via a status flag or a property or attribute of the previous sequence. Thus, the user may not be asked to save the sequence as a shortcut again, but the sequence may be offered in an auto-completion prompt, such as prompt 205 of FIG. 2.

If the user selects the indecision control 315, the system may proceed with reproducing the previous sequence of actions. The system may offer prompt 305 again the next time the user performs the previous sequence of actions. If the user selects the approval control 310, the system may save the previous sequence of actions as a shortcut sequence. In some implementations, this may be accomplished via status flag for the previous sequence or a property or attribute of the previous sequence. In some implementations, the system may store or move the previous sequence to another data store. In some implementations, selecting the approval control 310 may cause the system to initiate display of another user interface that enables the user to provide a name, an icon, and or a location for the shortcut. For example, the system may enable the user to specify that the shortcut be included in a home screen, in a widget menu, or some other location. In some implementations, the icon may be a modified version of the icon for the pizza place mobile application, which provides a visual indication that the shortcut reproduces actions in the pizza place mobile application. In some implementations, the prompt 305 may include an approval control 325 that is configured to have the user record a voice command for the short cut. The voice command may enable the user to initiate the shortcut, i.e., to reproduce the actions associated with the shortcut sequence, by voice activation. Of course, other implementations may allow the user to associate a an input action with the shortcut, e.g. a long press on the menu control of the pizza place application main menu or some other input action.

Figure 4:
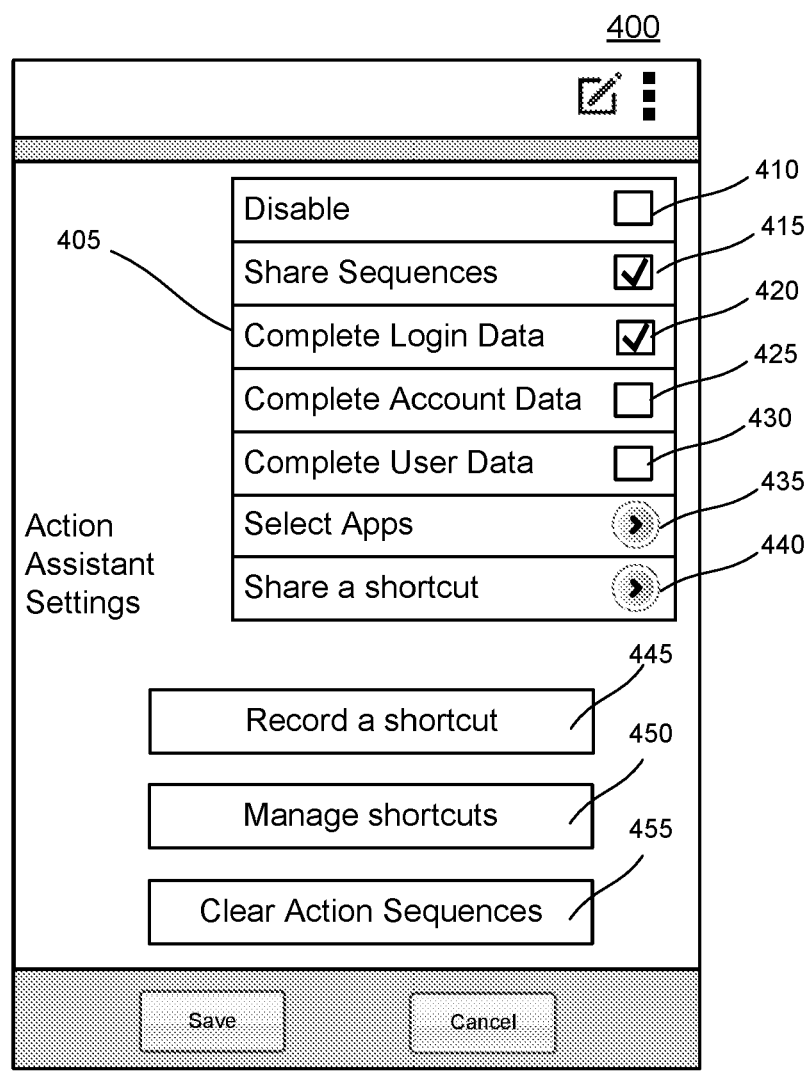
FIG. 4 illustrates an example user interface for selecting parameters for an action agent, according to an implementation.

FIG. 4 illustrates an example user interface for selecting parameters for an action agent, according to an implementation. A smart assist system, such as system 100 of FIG. 1, may generate the user interface 400. In some implementations, the user interface 400 may be generated by settings UI 140. In some implementations, the user interface 400 may be generated by a web application, e.g., at a server that accesses an account for the user. In the example of FIG. 4, the user interface 400 allows the user to select and adjust parameters used by an action agent. The settings can apply across any applications executing on a mobile device or can apply to specific applications. In some implementations, each mobile application may have a settings user interlace with elements similar to elements illustrated in the example user interface 400. In such implementations, the parameters entered or deleted apply to that particular mobile application.

In the example of FIG. 4, the user interface 400 includes controls for specifying various parameters that may be used by the action assistant to determine when to collect and store sequences of user actions, how to treat the actions (e.g., shareable or not), and what types of information to collect. In some implementations, the user interface may include a control 410 to disable the action assistant. The control 410 allows the user to turn off the action assistant. When the action assistant is disabled no sequence actions will be observed, captured, and stored. Thus the action assistant cannot provide a prompt for auto-completing a previous sequence. In some implementations, disabling the action assistant may also disable shortcut sequences. In other implementations, the action assistant can still reproduce a shortcut sequence when the shortcut is invoked by the user. The user interface may also include a control 415 that sets or clears a sharing parameter. When the sharing parameter is selected, the action assistant may share previous sequences with a server so that the server may perform across user learning for the similarity engine and/or the action predictor. Of course, the action assistant may remove personal information from the previous sequences before sharing. For example, user names, payment information, addresses, etc., may be replaced with tokens prior to sharing, if such information appears in the sequences. The sharing parameter may also enable the user to share a shortcut sequence with another device and/or another user. For example, the user may send a shortcut sequence to another mobile device owned by the user. As another example, the user may send a shortcut sequence to a mobile device of another user. If shared with another user, the action assistant may remove the personal information.

The user interface 400 may also include several controls for indicating whether particular input is not subject to automation. Input that is not subject to automation is not stored as part of the sequence of actions. In some implementations, the user interface may include control 420, which indicates the action assistant may include user login information when storing a sequence of actions. For example, the user may need a username and password to log into an application. If the control 420 is not selected, the action assistant may not store the user name or password. Thus, if control 420 is not selected, login information is not subject to automation. In some implementations, this may cause the action assistant to abandon the sequence or to close the sequence, so that the sequence ends at the interface requesting the login information. In some implementations, the action assistant may store the user name and passwords as tokens that indicate the action assistant cannot perform the sequence without the user supplying a value for the token. Thus, for example, the action assistant can reproduce the sequence until the action in the sequence that requires the user name; at which point the mobile device is displaying a user interface that requests the user name and password. Once the user has supplied this input, the action assistant may continue with reproduction of the remaining sequence. In such a situation the action assistant may perform a semi-automatic reproduction of the sequence; the reproduction is not fully automatic because it requires user interaction at some point during the sequence.

The user interface 400 may also include a control 425 that sets a parameter indicating whether or not to include payment or account input in the sequence. As with login data, the user may choose to have the payment information included, although a default option may be not to have the payment information included. Thus, if control 425 is not selected, payment and account information is not subject to automation. If no payment information is included, the action assistant may perform a semi-automatic reproduction of a sequence, as discussed above with regard to the login information.

The user interface 400 may also include a control 430 that sets a parameter indicating whether or not to include information about the user in the sequences. For example, if the control 430 is not selected the action assistant my not store the user's name, birth date, gender, etc., if provided as part of the sequence of actions. Thus, if control 430 is not selected, personal information is not subject to automation. As with the login and payment information, if the user information is not stored the action assistant may ignore the sequence, terminate the sequence, or replace the input items with a token.

In some implementations, one or more of controls 405, 445, 450, and 455 may be provided in an application specific user interface, so that the action assistant applies the parameters or actions to the particular application.

User interface 400 may also include a control 435 that enables a user to select which applications the action assistant may operate in or which applications the action assistant may not operate in. In other words, the parameters may include a whitelist of applications, which explicitly identifies applications the action assistant is enabled for or a blacklist of applications that the action assistant may explicitly be disabled for. Selection of the control 435 may initiate display of another window or user interface that lists the applications in the whitelist or the blacklist as well as controls for removing applications from the list or adding applications to the list.

User interface 400 may also include a control 440 that enables a user to share a shortcut sequence with another user. Selection of the control 440 may cause the system to initiate another window or user interface that allows the user to select another device, e.g., via a device identifier, a telephone number, a user name, etc., and select one of the shortcut sequences to share. In some implementations sharing may be accomplished via a voice command. For example, selection of the control 440 may initiate a listening mode that listens for a device identifier and a shortcut sequence identifier.

User interface 400 may also include a control 445 that enables the user to enter an explicit training mode. In an explicit training mode the actions performed by the user are saved as a shortcut sequence. In other words, the system does not compare the sequence to previous sequences to determine if it is sufficiently similar and then calculate a confidence score for completion; rather the system just observes the sequence of actions performed by the user and marks it as a shortcut sequence. The explicit training mode may be ended by an action by the user or at a point where the system typically closes a sequence of actions, the system may ask the user if the shortcut sequence should be ended.

User interface 400 may also include a control 450 to manage shortcut sequences. The user may name or rename shortcut sequences, delete shortcut sequences, record a voice command for a shortcut sequence, etc. The user interface 400 may also include a control 455 that deletes the previous saved sequences from the data store. In some implementations, actuation of the control 455 may delete all sequences not marked as a shortcut sequence. Although illustrated in a single user interface, implementations may include several user interfaces with the described functionality.

Figure 5:
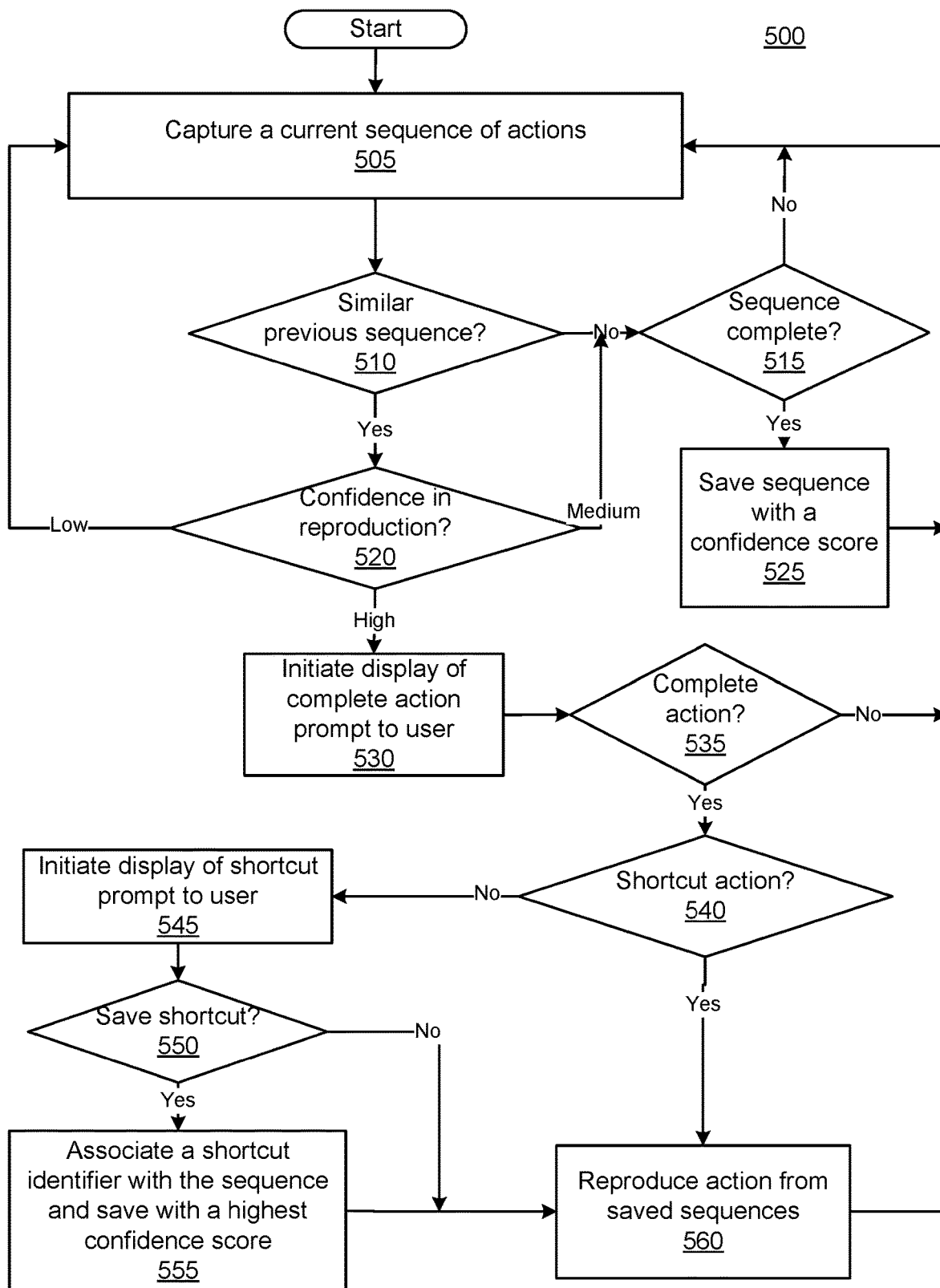
FIG. 5 illustrates a flow diagram of an example process for identifying repeated actions and providing a smart assist, m accordance with disclosed implementations.

FIG. 5 illustrates a flow diagram of an example process 500 for identifying repeated actions and providing a smart assist, in accordance with disclosed implementations. Process 500 may be performed by an action assistant executing on a mobile device, such as action assistant 120 of system 100 of FIG. 1. Process 500 may be used to identify a sequence of actions that the user has performed before and to offer to reproduce or finish the sequence automatically or semi-automatically for the user. Performing an action sequence automatically means that the user does not provide input during the reproduction of the sequence. Instead, the action assistant uses a previous sequence of actions to provide the input needed to achieve a result similar to the result achieved by the previous sequence. Performing an action sequence semi-automatically means that the user may be asked to provide one or more data items at some point during the reproduction of the sequence of actions. For example, the user may provide payment information or a login password during the reproduction of the sequence of actions. Process 500 may be run continuously, with user consent, in the background. In some implementations, portions of process 500 may be run continuously so that the system may monitor the user actions and organize the actions for future comparison. In other words, the system may use portions of process 500 to gather information in a training mode, e.g., gathering previous sequences to use for comparison with current sequences at a later time.

Process 500 may begin by the action assistant capturing a current user action sequence (505). The system captures the current sequence of user actions at a high level, or in other words a functional level. Thus, the system captures each action in the current set of actions by identifying a name or identifier for a control selected and identifying what the user typed or spoke, without reference to pixel coordinates. This makes reproducing actions more robust. Thus, each action in the sequence of actions can be reproduced so long as the controls in the user interface do not change names. In some implementations, the actions may be soft-matched to control names to provide more flexibility in reproducing actions. In some implementations, each action may have a structured representation that may not be human readable. The actions may be information stored as a sequence of data records. The action assistant captures a current sequence of actions as the user interacts with the mobile device, in other words, the current sequence of actions is captured as the user provides input. In addition to recording the actions, the system may also record signals for the action, such as the time of day, the application executing, the location, the movement of the mobile device, relative position of input to other elements visible on the screen, or any other characteristics of the workflow represented by the actions. Thus, capturing a current sequence of actions includes capturing the signals relevant to the actions.

The action assistant may determine whether the sequence of actions is similar to a previous sequence of actions (510). The action assistant may perform the comparison at some periodic interval of time or each time an action is added to the current sequence of actions. By performing the similarity comparison before the current sequence of actions is complete, the system can offer to reproduce the action for the user. The action assistant may use a similarity metric for determining whether the current sequence of actions is similar to a previous sequence of actions. The similarity metric may be a machine-learned model. The previous sequence of actions may be a sequence provided by the user at an earlier time and stored in a data store with user permission. The system may take as input signals stored with the previous sequence of actions and the current sequence of actions and may generate a similarity metric for the two sequences. In some implementations, the system may only determine a similarity metric between a previous sequence and the current sequence when the two sequences share certain minimal requirements, for example running on the same mobile application or web page. The current sequence and a previous sequence may be determined to be similar when the similarity metric satisfies, i.e., meets or exceeds, a similarity threshold.

When the current sequence is not similar to a previous sequence (510, No), the action assistant may determine whether the current sequence of actions is complete (515). The action assistant may determine that a sequence is complete based on a number of different factors, such as the user closing the mobile application or web page, the user completing or confirming a payment or order, receipt of a confirmation email, receipt of a confirmation text message, selection of a completion control (e.g., 'finish', 'submit', logout, etc.), inactivity, selection of a 'sleep' mode, and other similar user actions and events. If the sequence of actions is not complete (515, No), the system may continue capturing actions for the current sequence (505). If the sequence of actions is complete (515, Yes), the system may save the current sequence of actions, along with the signals for the current sequence, as a previous sequence of actions (525). In some implementations, the system may save the current sequence of actions with a confidence score. But because a current sequence of actions that is not similar to a previous sequence of actions has not yet had a confidence score generated, the system may not store this type of sequence with a confidence score.

When the current sequence is similar to a previous sequence (510, Yes), the system may calculate a confidence score for the current sequence of actions and the similar previous sequence(s) of actions (520). The confidence score may be a partially or fully machine learned model that is trained to predict whether the action assistant can properly reproduce a workflow represented by the previous set of actions. The prediction model may take various signals as input. One example signal is the behavior of the user across multiple workflows (previous sequences of actions) in the same web application, web page, or mobile application. This may include the number of button or other control selections. For example, if the user has selected a 'submit' control five times and a quantity control once across several previous sequences that are similar to the current sequence, this signal may contribute to a high confidence that the user performs the same workflow repeatedly. The prediction model may also use context signals. For example, the workflow may be consistent at a particular time of day or when the user is at a particular location, but inconsistent otherwise. If the context of the current sequence of actions matches the context of the consistent actions the model may have a higher confidence but a lower confidence otherwise. Another example of an input signal used as input may be the aggregate behavior of users in the same context. Such information may be generated using anonymized logs sent to a central server from different users, with user consent, Another example of an input signal is the frequency with which the user interface of the mobile application or web page changes. If buttons, text boxes, and other controls and inputs change frequently, the predictor may have less confidence in reproducing the workflow. Another example input signal is the variability of choices available in the particular workflow and the probability of following the same one. If the variability is low, the prediction model may have a high confidence even if there are not many previous sequences but if the variability is high the prediction model may have a lower confidence unless many previous sequences indicate the user follows (or in the aggregate, many uses follow) a particular sequence. Another example input signal is whether the workflow has been saved as a shortcut by the user. If the current sequence of actions is similar to a previous sequence of actions that is also marked or tagged as a shortcut, the prediction model may output a high confidence score.

The prediction model may be configured to provide a confidence score that can be classified as low, medium, or high. If the confidence score satisfies, i.e., meets or exceeds, a first confidence threshold, it may be considered high. If the confidence score fails to meet the first confidence threshold but meets or exceeds a second confidence threshold, the confidence score may be considered medium. If the confidence score fails to meet the first and the second confidence thresholds the score is considered low. If the confidence score is low, the system may disable the action assistant for that sequence, as it is too difficult to reproduce a similar workflow. Thus, the system may continue capturing, another sequence of actions (505), once the user begins a new sequence if the confidence score is considered medium, the system may determine whether the action is complete and, if it is (515, Yes), may save the current sequence in an observe and learn mode (525). For example, the current sequence may be saved as a previous sequence with the confidence score. The next time the system encounters a similar sequence, this previous confidence score may be used as an input signal to the prediction model. The prediction model may modify the confidence score so that eventually the system reaches a low or high confidence for the workflow represented by the sequence of actions. If the action is not complete, the system may continue to observe and learn while the user completes the sequence.

When the confidence score is high, the system may generate a prompt that asks the user whether or not the user wants to reproduce the action (530). The prompt may be similar to prompt 205 of FIG. 2. If the user does not want to reproduce the action (535, No), the system may continue capturing another workflow, e.g., starting at step 505. In some implementations, the system may mark previous similar workflows as disapproved, so that they are not offered again, or must meet a higher threshold to be presented again. If the user does want to reproduce the action (535, Yes) the system may determine whether the previous sequence of actions is already saved as a shortcut (540). If it is (540, Yes), the system may proceed with reproducing the workflow represented by the previous sequence of actions (560). To reproduce the workflow, the system may use the actions in the previous sequence to provide input and to select controls, e.g., buttons, menu options, radio or checkbox inputs, drop-down menu selections, etc., The system may reproduce the actions in the background or in the foreground. When reproduced in the background the user may not see the user interfaces generated in response to the inputs provided and controls selected by the system. In the foreground, the user may see the user interfaces.

If the previous set of actions is not already saved as a shortcut (540, No), the system may initiate a prompt to ask whether the user wants the action saved as a shortcut (545). This prompt may be similar to prompt 305 of FIG. 3. When the user does not want to save the workflow as a shortcut (550, No), the system may proceed with reproducing the workflow represented by the previous sequence of actions (560). When the user does want to save the workflow as a shortcut (550, Yes), the system may provide a way for the user to associate a shortcut identifier with the previous sequence of actions (555). The shortcut identifier can be a name, a voice command, an input sequence, and icon, etc., used to trigger the shortcut, in some implementations the system may also associate a description with the shortcut. The user may reproduce the shortcut sequence at any time by providing the voice command or selecting the icon or performing the input sequence associated with the shortcut. Thus, when the system receives the voice command, for example, the system may retrieve the previous sequence associated with the voice command and perform step 560. In addition to reproducing shortcut sequences, the system may be configured to share a shortcut sequence with one or more devices and/or users. For example, the system may allow a user to select a shortcut sequence and send it to another device. The other device may be associated with the user or with another user. If associated with another user, in some implementations, input in the sequence that is unique to the user, e.g., birthdates, user names, account information, may be anonymised prior to sending.

FIG. 6 shows an example of a generic computer device 600, which may be operated as system 100, and/or mobile device 180 of FIG. 1, which may be used with the techniques described here. Computing device 600 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system), The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a computing device, such as a laptop computer 632, personal computer 634, or tablet/smart phone 636. An entire system may be made up of multiple computing devices 600 communicating with each other. Other configurations are possible.

FIG. 7 shows an example of a generic computer device 700, which may be an example of server 190 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document, Distributed computing system 700 may include any number of computing devices 780, Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780*a* includes multiple racks 758*a*-758*n*. Each rack may include one or more processors, such as processors 752*a*-752*n* and 762*a*-762*n*. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700, Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random. Access Memory (RAM), Read Only Memory (ROM), and combinations thereof. Memory, such as memory 754 may also be shared between processors 752*a*-752*n*. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780*a* may communicate with devices 780*b*, 780*c*, and 7804, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

According to certain aspects of the disclosure, a method includes determining a current sequence of user actions with a mobile application is similar to a previous sequence of user actions and calculating a confidence score reflecting reproducibility of the previous sequence. The method also includes initiating, when the confidence score satisfies a confidence threshold, display of a prompt that requests approval for completing the current sequence of user actions using the previous sequence and completing the previous sequence responsive to receiving an indication of approval of the completion.

These and other aspects can include one or more of the following features. For example, the method may also include determining that the previous sequence is not a shortcut sequence, initiating display of a prompt that requests approval for saving the previous sequence as a shortcut sequence, and saving the previous sequence as a shortcut sequence in response to receiving an indication of approval for saving. In some implementations, the method may also include adding an icon for reproducing actions in the shortcut sequence to a home screen of a mobile device. As another example, the confidence score may be based on behavior of the user across multiple sequences of actions in the same application, based on context features for the sequence of actions, and/or based on an aggregate behavior of users across multiple sequences of user actions in the same application. As another example, determining that the current sequence of actions is similar to the previous sequence of actions can include features of input provided by the user and features of content presented by the application.

As another example, the method may also include determining that a second current sequence of user interactions is not similar to any previous sequence of user interactions, determining whether the second current sequence is complete, and saving the second current sequence as a second previous sequence when the second current sequence is complete. In some implementations, the second current sequence may be saved with a medium confidence score. As another example, the confidence threshold may be a first confidence threshold and the method further includes saving, when the confidence score fails to satisfy the first confidence threshold but satisfies a second confidence threshold, the current sequence as a saved sequence with a medium confidence.

According to certain aspects of the disclosure, a method includes determining that a first current sequence of user interactions fails to satisfy a similarity threshold with previous sequences of user interactions, determining that a first current sequence of actions is complete, and saving the first current sequence as a first previous sequence. The method also includes identifying a second current sequence as satisfying the similarity threshold with the first previous sequence and initiating display of a prompt that requests approval for saving the first previous sequence as a shortcut. The method may be run continuously in the background, with user consent. The method need not be triggered specifically by the user.

These and other aspects can include one or more of the following features. For example, the method may include generating a confidence score between the first previous sequence and the second current sequence, the confidence score indicating a confidence in automatically reproducing the first previous sequence and initiating display of the prompt when the confidence score meets a first confidence threshold. As another example, the method may include initiating display of a prompt that requests approval for reproducing the first previous sequence of actions and reproducing the first previous sequence of actions when approval to reproduce is indicated. As another example, the method may include associating a voice command with the first previous sequence of actions when approval for saving is received. As another example, the method may include associating a selectable icon with the first previous sequence of actions when approval for saving is received. As another example, determining that a first current sequence of user interactions is complete may include determining that a current action in the current sequence of actions includes input not subject to automation and/or determining that the user exited a mobile application.

According to certain aspects of the disclosure, a system includes at least one processor and memory storing instructions that, when executed by the at least one processor, causes the system to generate a user interlace. The user interface is configured to initiate recording a shortcut sequence of actions, each action in the sequence of actions being a high level description of a user interaction with a user interface. The user interface may also be configured to receive an indication that account data in a sequence of actions is to be included in the actions. The user interface may also be configured to receive an indication that sharing previous sequences of actions is permitted. The user interface may also be configured to clear previously stored sequences of actions. The user interface may also be configured to rename the shortcut sequence of actions. The user interface may also be configured to select applications in which the system captures a sequence of actions. The user interface may also be configured to receive an indication that a previous sequence of action can be shared.

According to certain aspects of the disclosure, a system includes at least one processor and memory storing instructions that, when executed by the at least one processor, causes the system to perform any of the methods disclosed herein.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor formed in a substrate, and can be implemented in a high-level procedural and/or object-oriented programming language, and/or in assembly/machine language. As used herein, the terms "machine-readable medium" "computer-readable medium." refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method implemented by one or more processors comprising:
   identifying a current sequence of user actions of a user with a mobile application executing at least in part at a computing device of the user;
   identifying, based on the current sequence of user actions, a previous sequence of user actions of the user with the mobile application executing at least in part at the computing device of the user;
   determining a confidence score indicative of whether the previous sequence of user actions can be utilized to complete the current sequence of user actions;
   in response to determining that the confidence score fails to satisfy a first confidence threshold and a second confidence threshold:
      classifying the confidence score indicative of whether the previous sequence of user actions can be utilized to complete the current sequence of user actions as low; and
      based on classifying the confidence score indicative of whether the previous sequence of user actions can be utilized to complete the current sequence of user actions as low:
         refraining from storing the current sequence of actions; and
         refraining from prompting the user to utilize the previous sequence of user actions to complete the current sequence of user actions;
   in response to determining that the confidence score fails to satisfy the first confidence threshold but satisfies the second confidence threshold:
      classifying the confidence score indicative of whether the previous sequence of user actions can be utilized to complete the current sequence of user actions as medium; and
      based on classifying the confidence score indicative of whether the previous sequence of user actions can be utilized to complete the current sequence of user actions as medium:
         storing the current sequence of user actions in association with the previous sequence of user actions; and
         refraining from prompting the user to utilize the previous sequence of user actions to complete the current sequence of user actions; and
   in response to determining that the confidence score satisfies the first confidence threshold:
      classifying the confidence score indicative of whether the previous sequence of user actions can be utilized to complete the current sequence of user actions as high; and
      based on classifying the confidence score indicative of whether the previous sequence of user actions can be utilized to complete the current sequence of user actions as high:
         prompting, via the computing device of the user, the user to utilize the previous sequence of user actions to complete the current sequence of user actions.

2. The method of claim 1, wherein determining the confidence score indicative of whether the previous sequence of user actions can be utilized to complete the current sequence of user actions comprises:
   processing, using a similarity prediction model, the previous sequence of user actions and the current sequence of user actions to generate a similarity metric between the previous sequence of user actions and the current sequence of user actions; and
   utilizing the similarity metric as the confidence score.

3. The method of claim 2, wherein the similarity metric indicates an extent of which it is predicted that the current sequence of user actions is repeating the previous sequence of user actions.

4. The method of claim 2, wherein processing the previous sequence of user actions and the current sequence of user actions to generate the similarity metric between the previous sequence of user actions and the current sequence of user actions and using the similarity prediction model further comprises:
   processing, using the similarity prediction model, and in addition to the previous sequence of user actions and the current sequence of user actions, metadata associated with the mobile application to generate the similarity metric between the previous sequence of user actions and the current sequence of user actions.

5. The method of claim 1, wherein determining the confidence score indicative of whether the previous sequence of user actions can be utilized to complete the current sequence of user actions comprises:
   processing, using an action prediction model, the previous sequence of user actions and the current sequence of user actions to generate the confidence score indicative of whether the previous sequence of user actions can be utilized to complete the current sequence of user actions.

6. The method of claim 5, wherein processing the previous sequence of user actions and the current sequence of user actions to generate the confidence score indicative of whether the previous sequence of user actions can be utilized to complete the current sequence of user actions and using the action prediction model further comprises:
   processing, using the action prediction model, and in addition to the previous sequence of user actions and the current sequence of user actions, one or more contextual signals associated with the mobile application to generate the confidence score indicative of whether the previous sequence of user actions can be utilized to complete the current sequence of user actions.

7. The method of claim 6, wherein the one or more contextual signals comprise one or more of: behavior of the user across multiple sequences of user action, similar sequences of user actions of additional users that are in addition to the user, or whether a user interface of the mobile application has changed between the previous sequence of user actions being performed and the current sequence of user actions being performed.

8. The method of claim 1, further comprising:
   subsequent to prompting, via the computing device of the user, the user to utilize the previous sequence of user actions to complete the current sequence of user actions:
      receiving user input to utilize the previous sequence of user actions to complete the current sequence of user actions; and causing the previous sequence of user actions to be utilized to complete the current sequence of user actions.
9. The method of claim 8, further comprising:
receiving further user input to store the previous sequence of user actions as a shortcut sequence of user actions.
10. A system comprising:
at least one processor; and
memory storing instructions that, when executed, cause the at least one processor to be operable to:
identify a current sequence of user actions of a user with a mobile application executing at least in part at a computing device of the user;
identify, based on the current sequence of user actions, a previous sequence of user actions of the user with the mobile application executing at least in part at the computing device of the user;
determine a confidence score indicative of whether the previous sequence of user actions can be utilized to complete the current sequence of user actions;
in response to determining that the confidence score fails to satisfy a first confidence threshold and a second confidence threshold:
classify the confidence score indicative of whether the previous sequence of user actions can be utilized to complete the current sequence of user actions as low; and
based on classifying the confidence score indicative of whether the previous sequence of user actions can be utilized to complete the current sequence of user actions as low:
refrain from storing the current sequence of actions; and
refrain from prompting the user to utilize the previous sequence of user actions to complete the current sequence of user actions;
in response to determining that the confidence score fails to satisfy the first confidence threshold but satisfies the second confidence threshold:
classify the confidence score indicative of whether the previous sequence of user actions can be utilized to complete the current sequence of user actions as medium; and
based on classifying the confidence score indicative of whether the previous sequence of user actions can be utilized to complete the current sequence of user actions as medium:
store the current sequence of user actions in association with the previous sequence of user actions; and
refrain from prompting the user to utilize the previous sequence of user actions to complete the current sequence of user actions; and
in response to determining that the confidence score satisfies the first confidence threshold:
classify the confidence score indicative of whether the previous sequence of user actions can be utilized to complete the current sequence of user actions as high; and
based on classifying the confidence score indicative of whether the previous sequence of user actions can be utilized to complete the current sequence of user actions as high:
prompt the user to utilize the previous sequence of user actions to complete the current sequence of user actions.

11. The system of claim 10, wherein, in determining the confidence score indicative of whether the previous sequence of user actions can be utilized to complete the current sequence of user actions, the at least one processor is to:
process, using a similarity prediction model, the previous sequence of user actions and the current sequence of user actions to generate a similarity metric between the previous sequence of user actions and the current sequence of user actions; and
utilize the similarity metric as the confidence score.
12. The system of claim 11, wherein the similarity metric indicates an extent of which it is predicted that the current sequence of user actions is repeating the previous sequence of user actions.
13. The system of claim 11, wherein, in processing the previous sequence of user actions and the current sequence of user actions to generate the similarity metric between the previous sequence of user actions and the current sequence of user actions and using the similarity prediction model, the at least one processor is to:
process, using the similarity prediction model, and in addition to the previous sequence of user actions and the current sequence of user actions, metadata associated with the mobile application to generate the similarity metric between the previous sequence of user actions and the current sequence of user actions.
14. The system of claim 10, wherein, in determining the confidence score indicative of whether the previous sequence of user actions can be utilized to complete the current sequence of user actions, the at least one processor is to:
process, using an action prediction model, the previous sequence of user actions and the current sequence of user actions to generate the confidence score indicative of whether the previous sequence of user actions can be utilized to complete the current sequence of user actions.
15. The system of claim 14, wherein, in processing the previous sequence of user actions and the current sequence of user actions to generate the confidence score indicative of whether the previous sequence of user actions can be utilized to complete the current sequence of user actions and using the action prediction model, the at least one processor is to:
process, using the action prediction model, and in addition to the previous sequence of user actions and the current sequence of user actions, one or more contextual signals associated with the mobile application to generate the confidence score indicative of whether the previous sequence of user actions can be utilized to complete the current sequence of user actions.
16. The system of claim 15, wherein the one or more contextual signals comprise one or more of: behavior of the user across multiple sequences of user action, similar sequences of user actions of additional users that are in addition to the user, or whether a user interface of the mobile application has changed between the previous sequence of user actions being performed and the current sequence of user actions being performed.
17. The system of claim 10, wherein the at least one processor is further operable to:
subsequent to prompting, via the computing device of the user, the user to utilize the previous sequence of user actions to complete the current sequence of user actions:

receive user input to utilize the previous sequence of user actions to complete the current sequence of user actions; and cause the previous sequence of user actions to be utilized to complete the current sequence of user actions.

18. The system of claim 17, wherein the at least one processor is further operable to:

receive further user input to store the previous sequence of user actions as a shortcut sequence of user actions.

19. A non-transitory computer-readable storage medium storing instructions that, when executed, cause at least one processor to be operable to perform operations, the operations comprising:

identifying a current sequence of user actions of a user with a mobile application executing at least in part at a computing device of the user;

identifying, based on the current sequence of user actions, a previous sequence of user actions of the user with the mobile application executing at least in part at the computing device of the user;

determining a confidence score indicative of whether the previous sequence of user actions can be utilized to complete the current sequence of user actions;

in response to determining that the confidence score fails to satisfy a first confidence threshold and a second confidence threshold:

classifying the confidence score indicative of whether the previous sequence of user actions can be utilized to complete the current sequence of user actions as low; and based on classifying the confidence score indicative of whether the previous sequence of user actions can be utilized to complete the current sequence of user actions as low:

refraining from storing the current sequence of actions; and refraining from prompting the user to utilize the previous sequence of user actions to complete the current sequence of user actions;

in response to determining that the confidence score fails to satisfy the first confidence threshold but satisfies the second confidence threshold:

classifying the confidence score indicative of whether the previous sequence of user actions can be utilized to complete the current sequence of user actions as medium; and based on classifying the confidence score indicative of whether the previous sequence of user actions can be utilized to complete the current sequence of user actions as medium:

storing the current sequence of user actions in association with the previous sequence of user actions; and refraining from prompting the user to utilize the previous sequence of user actions to complete the current sequence of user actions; and in response to determining that the confidence score satisfies the first confidence threshold:

classifying the confidence score indicative of whether the previous sequence of user actions can be utilized to complete the current sequence of user actions as high; and based on classifying the confidence score indicative of whether the previous sequence of user actions can be utilized to complete the current sequence of user actions as high:

prompting the user to utilize the previous sequence of user actions to complete the current sequence of user actions.

\* \* \* \* \*